United States Patent [19]

Rundel et al.

[11] 4,092,508

[45] May 30, 1978

[54] MODULAR ELECTRICAL CONTROL STATION WITH SWITCH DETENT MEANS

[75] Inventors: Morton Stanley Rundel, Redwood City, Calif.; Frank R. Keller, Spring House, Pa.

[73] Assignee: Gould, Inc., Rolling Meadows, Ill.

[21] Appl. No.: 708,191

[22] Filed: Jul. 23, 1976

[51] Int. Cl.[2] .......... H01H 3/50

[52] U.S. Cl. .......... 200/291; 74/10.41; 74/527

[58] Field of Search .......... 200/291, 17 B; 74/10.41, 527, 531, 553

[56] References Cited

U.S. PATENT DOCUMENTS

| | | | |
|---|---|---|---|
| 3,739,126 | 6/1973 | Sahrbacker | 200/291 |
| 3,768,333 | 10/1973 | Bidwell | 200/291 |
| 3,986,410 | 10/1976 | Robinson | 74/527 |

*Primary Examiner*—Gerald P. Tolin

*Attorney, Agent, or Firm*—Limbach, Limbach & Sutton

[57] ABSTRACT

A modular control station construction wherein a single housing may receive numerous possible combinations of contact blocks (switches) and panel light socket blocks which cooperate with either one, two or three panel members, as desired. The panel members available are a spring loaded push button contact block actuator, a rotary switch contact block actuator that is adjustable between two and three positive positions, and a panel light lens.

1 Claim, 14 Drawing Figures

4 4 5 5 29 41a 41c 105 43 101 41b 107 45 41 103 109 111 113

117 29 61 119 101 103 63 25 27

51
53
47

55
49
117
7
8
61
65
6
57
59
43
45
29
31
32
41
13
33
35
17
15
39
37

27
67
23
28
2
25
75
71
11
19
73

21
77
71
79
73
11
75
19

21
11
71
75
19

81
21
11
73
75
19

4
5
43
29
41a
41c
105
101
41b
107
41
45
103
109
111
113
4
5

29
83
81
31
32
41

29
83'
101

31
32
81'
43

FIG. 6
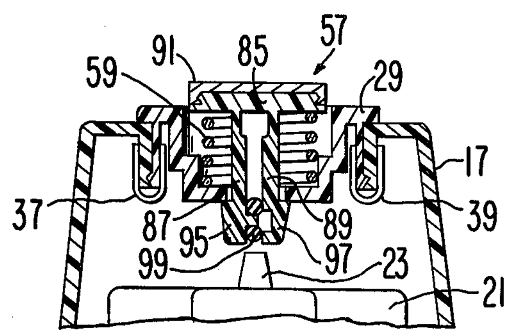
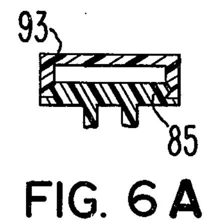
FIG. 6A
FIG. 7
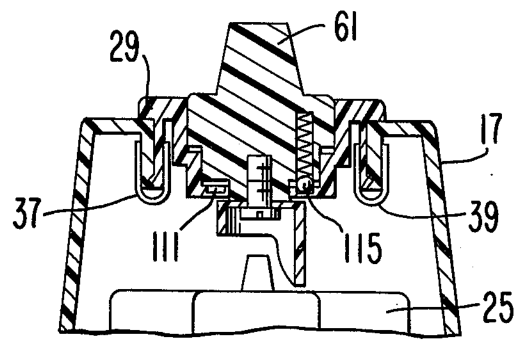
FIG. 8
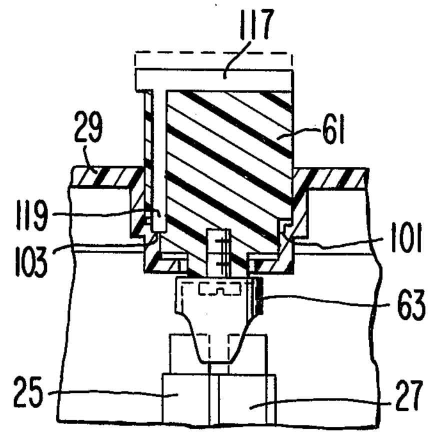
FIG. 9
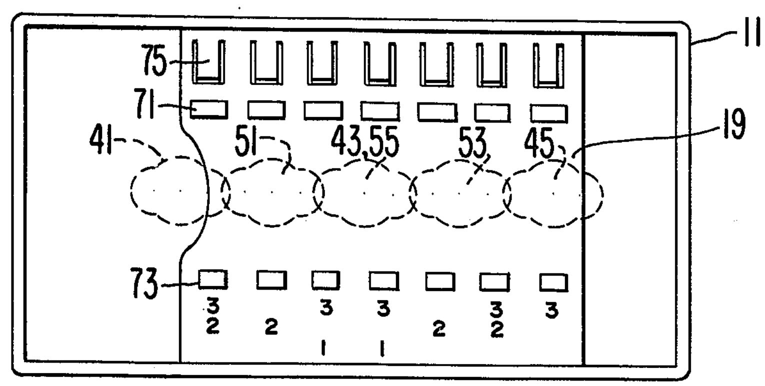

MODULAR ELECTRICAL CONTROL STATION WITH SWITCH DETENT MEANS

BACKGROUND OF THE INVENTION

This invention relates generally to electrical control assemblies including control switches and the like, and more particularly to such assemblies that provide a degree of flexibility as to the various switching functions that may be combined from common components.

Nearly every installation in industry involving heavy electrical equipment such as electrical motors includes controls therefor of a low current type that is electrically connected to solenoid switches of the main electrical supply lines on the piece of equipment itself. The control is often remotely positioned from the equipment to be controlled. A particular control assembly depends upon the application, of course, and may have various combinations of push button control switches, rotary switches and indicating pilot lights. Presently, each particular combination of a control assembly is separately manufactured and carried in inventory in a completed form.

Therefore, it is a primary object of the present invention to provide cooperating elements for easy assembly into any one of numerous possible modular electrical control station combinations.

SUMMARY OF THE INVENTION

Briefly and generally, this primary object is accomplished by the present invention wherein a housing is provided having a top opening giving access to its interior, a plurality of cover plates that differ by the number of holes therein being easily snap fitted into the top opening of the housing, control members in turn being fitable into the openings of the cover plate (selected from a spring loaded push button, a rotary switch or a pilot light lens) with means provided for snap fitting appropriate electrical contact assemblies or pilot light socket blocks within said housing at positions with respect to the openings of the cover plate that permits cooperation with the respective panel element installed in the opening.

The result is that only a few different types of parts need to be manufactured and carried in inventory. The parts as designed to be combined substantially entirely by hand through snap fitting plastic members for providing a particular desired combination of switches and indicator lights. These combinations may even be made by the ultimate user himself who can maintain a supply of the few required parts on hand, or they may be assembled to order by the manufacturer in a manner much more easily than heretofore.

Additionally, as part of the present invention, an imporved snap fitting is provided for quick and sure assembly of contact blocks and light socket blocks into the housing without the use of tools. Upright inverted L-shaped hooks are provided at the bottom of the housing for receipt by mating receptacles at the bottom of the blocks. Once inserted, the block is moved along the bottom of the housing to engage the hooks. This movement also activates a resilient snap lock that prevents further movement of the block along the base until the snap lock is manually disengaged. This manner of connecting two elements further has additional applications in other environments wherein two elements are desired to be connected together.

According to other aspects of the present invention, a particular rotary knob structure is provided that permits either two or three positive positions to be maintained by the rotary knob. The adjustment between two or three positions is easily carried out by hand. Additionally, an improved push button structure is provided that permits easy insertion and removal by hand of a spring loaded push button assembly. The rotary knob and push button assembly cooperate with contact blocks properly placed and connected within the control assembly housing for carrying out desired switching operations.

Additional objects, advantages and features of the present invention are given in the following detailed description of its preferred embodiment which should be taken in conjunction with the accompanying drawings.

BRIEF DESCRIPTION OF THE DRAWINGS

FIG. 6 is a cross-sectional view of a portion of the assembly of FIG. 1 taken across section 6—6 thereof in an assembled form;

FIG. 6A illustrates a modification of a portion of FIG. 6;

FIG. 7 is a cross-sectional view of a portion of the assembly of FIG. 1 taken across section 7—7 thereof when in an assembled form;

FIG. 8 is a cross-sectional view of a portion of the assembly of FIG. 1 taken across section 8—8 thereof when in an assembled form; and FIG. 9 is a plan view of the base and retainer assembly of FIG. 1.

DESCRIPTION OF THE PREFERRED EMBODIMENT

Figures 1, 1A, 1B:
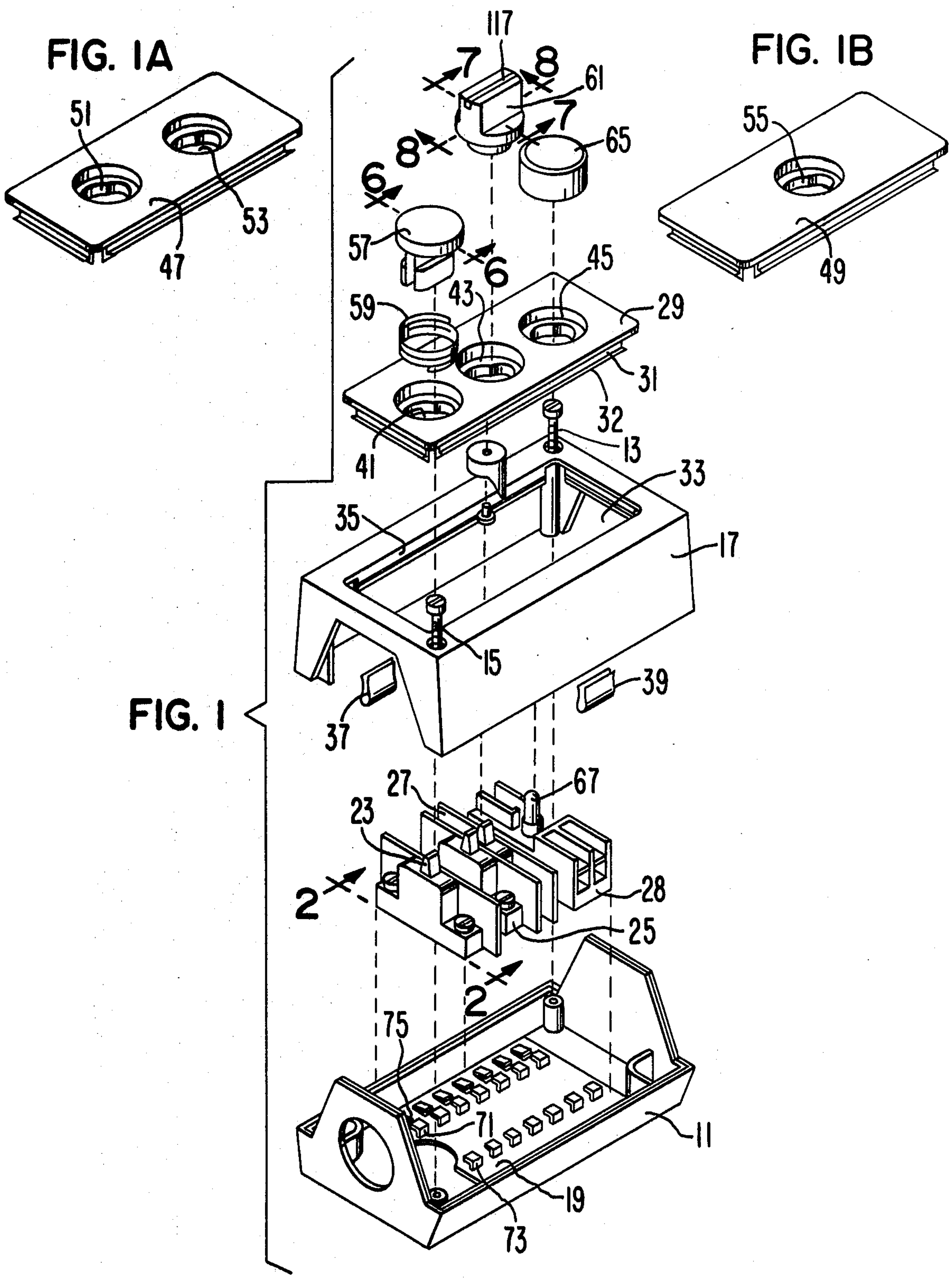
FIG. 1 is an exploded view of a control assembly embodying the various aspects of the present invention in a particular example.
FIGS. 1A and 1B show alternate cover plates to that shown in FIG. 1.

The modular electrical control station construction of the present invention permits the formation of a large number of different combinations of control functions into a single type of enclosure with only a few basic component types. Referring principally to FIGS. 1, 1A and 1B, at least one of each of the basic components used as building blocks to form a desired control station is illustrated. A base 11 has a cover 17 attached thereto by screws 13 and 15. On a bottom surface of the base member 11 is installed a retainer 19 having seven parallel rows of tabs that each carry the same elements and extend across the narrow dimension of the rectangularly shaped base bottom surface.

A contact block 21 is provided with mating connecting members for installation in any one of the seven rows of tabs on the retainer 19. The contact block 21 is characterized by a spring loaded mechanical push button 23 on its top surface. The contact block 21 is chosen to be one of two types. Depression of the button 23 on one type of contact block will cause an internal electrical connection to be made between its two external electrical terminals (normally open type). Another type of contact block 21 will cause an electrical circuit between its two external terminals to break when the button 23 is pushed (normally closed type). Two other contact blocks 25 and 27 are also illustrated in the particular combination of FIG. 1 and are individually chosen to be of the normally closed or normally open type according to the desired application. A lamp socket block 28 attaches to the base 11 by any two adjacent rows of tabs of the retainer 19.

To the housing formed by attachment of the cover 17 to the base member 11 is added a cover plate 29. The cover plate 29 has a downwardly extending wall along each of its four sides, one such wall denoted by the reference number 31. At the bottom of that wall is a rib 32. A rectangular opening 33 in the top of the cover 17 also has downwardly extending walls on each of its four sides, such as the wall 35. The lower portion of each of these cover walls contains either a groove or a lower most edge matched to receive a mating rib, such as the rib 32. All downwardly extending walls, molded integrally with their associated part, have dome resiliency and thus results in the cover plate 29 securely snapping into place on the cover 17 when the downward extending walls of the cover plate 29 are inserted into the opening 33. For an additional secure connection, metal spring clips 37 and 39 may be used to urge adjoining walls, to which they are clipped, toward each other.

The cover plate 29 has been shown to be of the type having three openings, 41, 43 and 45 therein for receiving three different panel members. Alternative cover plates 47 and 49 of FIGS. 1A and 1B, respectively, may alternatively be utilized for appropriate control stations. The cover plates 47 and 49 are of the same size and fit in the same way in the opening 33 of the cover 17 as does the cover plate 29. The only difference between the cover plate types is in the number of holes provided for attachment of panel members. If any two panel members are needed, the cover plate 47 is utilized having its two holes 51 and 53. Similarly, if only one panel member need be utilized, the cover plate 49 is chosen having a single hole 55.

FIG. 1 illustrates one each of three possible panel members utilized together in a final control station. One of these panel members is a push button assembly that includes a push button 57 and a spring 59. The second panel member illustrated is a rotary switch assembly including a rotary knob 61 that is fixed to a cam element 63 protruding below the hole 43. The third member illustrated in FIG. 1 is a panel light lens 65 that receives light through the opening 43. The circularly shaped lens 65 snaps into a circular depression within the cover plate that surrounds the hole 45.

Although a particular combination of components is illustrated in FIG. 1 for discussion purposes, the principal advantage of the components is that they may be combined in many different ways. A push button assembly may be installed into any one of the holes of the cover 29, 47 and 49. Similarly, the lens 65 can be installed into a depression surrounding any of the holes of any of the three different cover plates. Because of a slightly more complex structure, only one of the holes of each of the cover plates is necessarily formed with associated recesses and grooves for operably receiving the rotary knob 61, as described in more detail hereinafter, but each of the holes could be so structured if desired. It should be noted that any of the possible custom arrangements of the various components illustrated can be made without the use of any tools except for a screw driver for the three screws illustrated in FIG. 1.

In the particular combination of FIG. 1, an electrical pilot lamp 67 is connected to the lamp block 28 for shining through the lens 65. The lens 65 can be manufactured in as many different colors as desired. The contact block 21 is positioned on the base 11 under the hole 41 of the cover plate 29 in the path of the push button 57. The button 23 of the contact block 21 is depressed when the push button 57 is so depressed. The two contact blocks 25 and 27 are positioned for their top buttons to be depressed upon rotation of the cam 63 by the knob 61. The cam 63 and the contact block top push button sides are cooperatively shaped so that rotation of the cam 63 by the knob 61 will cause one or the other of the contact blocks 25 or 27 to be depressed, depending upon which direction the knob is turned from the rest position shown in FIGS. 1, 7 and 8. It is often convenient that one of the contact blocks 25 and 27 be a normally open type and the other be a normally closed type.

Figure 2:
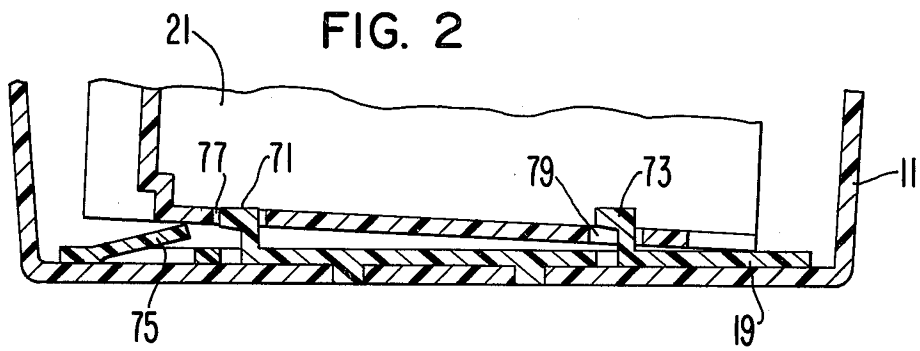
FIG. 2 is a cross-sectional view of a portion of the assembly of FIG. 1 taken at section 2—2 thereof in an assembled form.
Figure 2A:
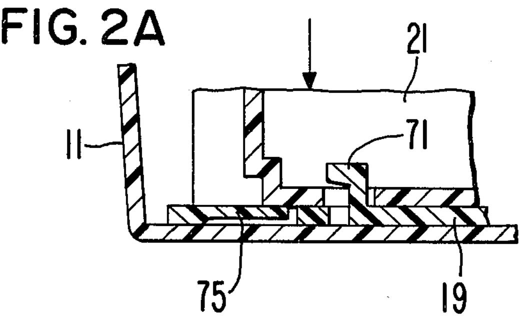
FIGS. 2A and 2B illustrate the connection of parts shown in FIG. 2 after further relative movement therebetween.
Figure 2B:
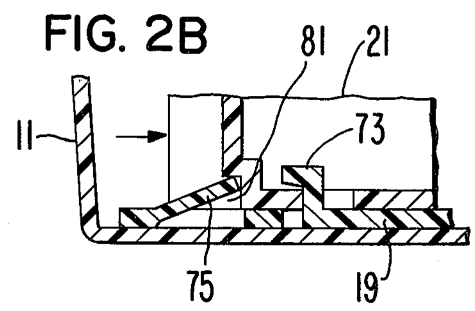

Referring to FIGS. 2, 2A and 2B, the structure permitting a tooless snap connection of a contact block or lamp socket block to the retainer 19 of the base 11 is illustrated. Each of the seven rows of upstanding tabs of the retainer 19 include two upwardly extending inverted L-shaped hooks 71 and 73 as well as a resilient tab 75 that normally extends upward upon its hinge connection with the retainer 19. Each of the hooks 71 and 73 contains an orthogonally upright portion and a terminal portion intergral therewith that is substantially parallel to the plane of the retainer plate 19 but spaced a distance thereabove.

Each of the contact and lamp socket blocks, such as the contact block 21 being illustrated, includes two apertures 77 and 79 spaced apart in size to fit, respectively, downward over the hooks 71 and 73. As the block 21 is pushed downward against the force of the resilient tab 75, it is pushed against the surface retainer 19, as shown in FIG. 2A. The block 21 is then moved laterally across the narrow dimension of the retainer 19 until its bottom wall is held within the hooks 71 and 73, as shown in FIG. 2B. Of course, the upper portion of the hooks 71 and 73 are spaced just far enough above the surface of the retainer 19 to permit the wall of the block 21 to securely fit thereunder.

As shown in FIG. 2B, once the block 21 is moved as far as permitted by the hook 73, the tab 75 is permitted by a notch 81 at one end of the block 21 to resiliently return to an upright position. When in the position shown in FIG. 2B, the block 21 is securely fastened to the retainer 19 until a time that the tab 75 is pushed downward to permit the reverse sliding movment of the block 21 and lifting up from the hooks 71 and 73.

As can best be seen from FIG. 9, the hooks 71 and 73 have different widths in plan view. The apertures 77 and 79 in the bottom of a block 21 similarly have different matching widths, thereby assuring that the block will be oriented in the correct direction when inserted. The three connecting elements of each of the seven rows of the retainer 19 are similarly shaped and oriented for identical operation with a block to be connected therewith.

Referring again to FIG. 9, the rows of connecting elements are shown with the various holes of the cover plates 29, 47 and 49 (FIGS. 1, 1A and 1B) shown in dotted outline in order to illustrate the relative position therebetween. The hole 45 of the three hole plate 29 is positioned so that the panel member selected therefor cooperates with a block or blocks attached to the first two rows of connecting elements of the retainer 19 (rows numbered from right to left). The center hole 43 of the three hole plate 29 and the hole 55 of the one hole plate 49 are superimposed in the position to cooperate with the blocks attached to either or both of the fourth and fifth rows of connecting elements of the retainer 19. The hole 41 in the three hole plate 29 cooperates with only the seventh row of connecting elements. An eigth row could be added to the retainer 19 for operation with the opening 41 as well, if desired. The hole 51 of the cover plate 47 is similarly associated with the fifth and sixth rows of contact elements and the hole 53 of that same plate is associated with the second and third rows.

Figure 3:
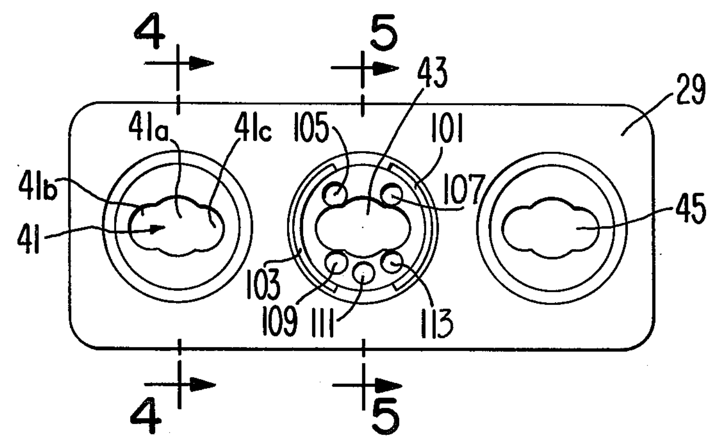
FIG. 3 shows in plan view the cover plate of FIG. 1.
Figure 4:
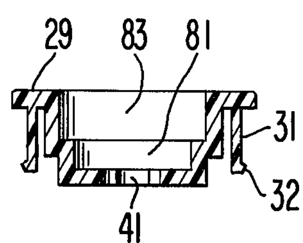
FIG. 4 is a sectional view of the cover plate of FIG. 3 taken across section 4—4 thereof.

Referring principally to FIGS. 3 and 4, a shape common to all of the holes in the cover plates may be described. Using the hole 41 as an example, it is formed of a circular portion **41*a* having a center at the center of the hole structure about which remaining structural features of the hole are symmetrical. On either side of the circular opening 41*a* are two additional circular openings 41*b* and 41*c* having lesser diameters than the opening 41*a* and having their centers removed along the length of the cover plate 29 from the center of the opening 41*a*. All three openings overlap, to form a single opening having a long direction in the long direction of the rectangular cover plate 29. Surrounding the hole 41 is a circular walled portion 81 and yet surrounding that is a circular walled portion 83 extending upward to the top surface of the cover plate 29. The centers of the walled portions 81 and 83 are concentric with the center of the opening 41**.

Referring principally to FIG. 6, the construction and operation of a push button panel member is described. The push button 57 is made of a unitary base portion 85 and two downwardly extending prongs 87 and 89 that form a stem of the push button assembly. Snapped onto the base 85 is a cap member 91. A selection of cap members may be provided as part of the components available for assembling particular control stations. The caps may be of various colors and may carry notations such as "start" and "stop." It is sometimes desirable to have the push button extend further outward from the control station, so a second set of different sized caps, such as that shown in FIG. 6A as cap 93, may be provided. The cap 93 has a larger thickness than the cap 91 but they both snap onto the base 85 of the push button asembly in the same manner.

Each of the prongs 87 and 89 of the push button assembly have, respectively, enlarged outwardly extending portions 95 and 97 at their lower extremities. These portions join the main part of the stems 87 and 89 by a ledge which, when the push button is installed as shown in FIG. 6, serve to limit travel of the push button assembly away from the front of the cover plate 29. The outside surfaces of the enlarged portions 95 and 97, however, are tapered inwardly toward their button edges so that the knob stem can be inserted through the hole 41. The stems 87 and 89 are resilient enough that they can be pressed together for fitting the enlarged portions 95 and 97 through the hole 41. After such insertion, an O-ring spacer 99 may be placed in the gap between the prongs 87 and 89 in order to prevent them from moving together when it is not desired for them to do so.

As can be seen best by the perspective view of FIG. 1, the prongs 87 and 89 of the push button structure are elongated in width. This elongated shape matches that of the hole 41 and provides enough width for operating two contact blocks simultaneously, if desired. The spring 59 is normally in a compressed state between the underside of the push button base 85 and the region of the cover plate 29 surrounding the hole 41 within the depression 81.

Figure 5:
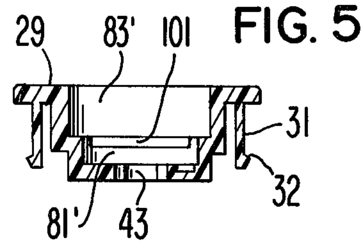
FIG. 5 is a sectional view of the cover plate of FIG. 3 taken across section 5—5 thereof.

Referring to FIG. 5, the rotating knob receiving structure of the cover plate 29 surrounding the opening 43 will be described. This structure is provided around at least one hole of every cover plate and permits the rotating knob to be maximally utilized. In a ledge adjoining circular depressions 81' and 83' are arcuate grooves 101 and 103. Each of these grooves has the same radius with respect to the center of the hole 43 and has a arcuate extent of something less than 180°. The arcuate grooves 101 and 103 are equally spaced around a complete circle; that is, there is equal space between them on either side.

As further structure for a knob assembly operation, two circular depressions 105 and 107 are provided on one side of the hole 43 and in the button of the circular portion 81'. On the other side of the hole 43 are three such depressions 109, 111 and 113. All of these five circular depressions have their centers on a circle with its center coincident with that of the hole 43. The two depressions 105 and 107 are positioned in one 180° segment of that circle and the other three depressions 109, 111 and 113 are positioned on the other 180° segment of that circle.

Referring principally to FIGS. 7 and 8, the structure of the knob that cooperates with the just described features of the cover plate 29 will be described. A spring loaded detent 115 is carried by the knob 61 at a position to engage any of the circular depressions 105 through 111 of FIG. 3. The bottom of the detent 115 is rounded so that the knob is not prevented from moving past such an engagement but rather the detent 115 merely provides a positive position that the operator can feel. When in any of the depressions 105, 107, 109, 111 and 113, the detent 115 also maintains the cam 63 in a position holding down the top button of one of the contact block 25 and 27.

A slide 117 (FIG. 8) is provided within the knob 61. It has a lower extremity thereof a projection 119 that is radially positioned for riding in either of the grooves 103 or 101 (FIG. 3) of the cover plate 29. When the projection 119 is riding in the groove 103, the knob 61 will have three positive positions since the detent 115 will move among the circular holes 109, 111 and 113 of the cover plate 29. The finite arcuate extent of the groove 103 prevents the knob from being rotated any further than that. If for a particular installation, however, a rotary knob having only two positive positions is desired, then the slide 117 of the knob is lifted upward to disengage the projection 119 from the groove 103. The knob is then rotated 180° and the slide 117 again depressed back into the knob for its projection 119 to engage the slot 101. The upward limit of the slide 117 is shown in dotted outline in FIG. 8. These features permit a single rotary knob structure to be used for two or three position operation rather than requiring two different component structures to be built.

Although the various aspects of the present invention have been described with respect to a particular preferred embodiment thereof, it will be understood that the invention is entitled to protection within the full scope of the appended claims. For instance, although certain of the aspects of the present invention have been described with respect to a particular modular electrical control station assembly where they have a high degree of utility, it will be recognized that these features have a broader application in other environments and applications as well.

We claim:

1. A rotary switch structure that permits easy selection of the number of positive positions, comprising:

a panel having an opening therein through which a stem extends to the rear from its attachment at the front of the panel to an operating knob, two arcuate tracks provided on the front side of said panel around said opening, each of said tracks extending less than 180° and being positioned on opposite sides of said opening, a first group of indentations on the front side of said panel arranged in an arcuate path extending less than 180° on one side of said opening, a second set of a differnt number of indentations on an arcuate path of less than 180° positioned on an opposite side of said opening, a spring loaded detent provided on the underside of said knob and arranged for engaging said indentations for providing the positive stops of said knob, and a second detent mechanically operated between a position for riding in either of said circular tracks and another position removed therefrom, whereby the knob may be mechanically selected for operation with respect to said first set of indentations or said second set of indentations as desired.

* * * * *

UNITED STATES PATENT AND TRADEMARK OFFICE
CERTIFICATE OF CORRECTION

PATENT NO. : 4,092,508

DATED : May 30, 1978

INVENTOR(S) : Morton Stanley Rundel, et al.

It is certified that error appears in the above-identified patent and that said Letters Patent are hereby corrected as shown below:

On the title page, item [75] the name of joint inventor -- Peter M. Moritz -- should be added.

Column 1, line 47, "as" should read -- are --.

Column 1, line 56, "imporved" should read -- improved --.

Column 3, line 25, "dome" should read -- some --.

Column 4, line 34, "intergral" should read -- integral --

Signed and Sealed this

*Thirteenth* Day of *March 1979*

[SEAL]

*Attest:*

RUTH C. MASON
*Attesting Officer*

DONALD W. BANNER
*Commissioner of Patents and Trademarks*